US011310044B2

(12) United States Patent
Keskar

(10) Patent No.: US 11,310,044 B2
(45) Date of Patent: Apr. 19, 2022

(54) AUTHENTICATE TRANSACTIONS OF SECURED FILE IN BLOCKCHAIN

(71) Applicant: Innoplexus AG, Eschborn (DE)

(72) Inventor: Abhijit Keskar, Pune (IN)

(73) Assignee: Innoplexus AG, Eschborn (DE)

( * ) Notice: Subject to any disclaimer, the term of this patent is extended or adjusted under 35 U.S.C. 154(b) by 45 days.

(21) Appl. No.: 16/451,458

(22) Filed: Jun. 25, 2019

(65) Prior Publication Data

US 2019/0334704 A1 Oct. 31, 2019

Related U.S. Application Data

(63) Continuation of application No. 16/011,112, filed on Jun. 18, 2018.

(Continued)

(51) Int. Cl.
*H04L 9/08* (2006.01)
*G06Q 20/06* (2012.01)
(Continued)

(52) U.S. Cl.
CPC ............ *H04L 9/088* (2013.01); *G06F 21/606* (2013.01); *G06F 21/6218* (2013.01);
(Continued)

(58) Field of Classification Search
None
See application file for complete search history.

(56) References Cited

U.S. PATENT DOCUMENTS

| 6,789,195 B1 * | 9/2004 | Prihoda | G06F 21/602 |
| | | | 713/155 |
| 10,135,870 B2 * | 11/2018 | Castinado | H04L 9/3247 |

(Continued)

OTHER PUBLICATIONS

"What is Blockchain and Why Should Records Management Professionals Care?" Iron Mountain, Nov. 29, 2016, https://www.ironmountain.com/resources/general-articles/w/what-is-blockchain-and-why-should-records-management-professionals-care. (Year: 2016).*

*Primary Examiner* — Kelly S. Campen
*Assistant Examiner* — Shacole C Tibljas
(74) *Attorney, Agent, or Firm* — Innovation Capital Law Group, LLP; Vic Lin

(57) ABSTRACT

Disclosed is system and method for authenticating secured file transactions. Hash of transaction is stored in distributed ledger. Unencrypted intent, encrypted intent of first agent module is generated. Unencrypted consent, encrypted consent of server arrangement is generated. Encrypted consent is communicated to the first agent module along with a location of second agent module. Encrypted consent, the unencrypted intent, the hash and the first agent key are communicated to the second agent module. Encrypted consent is communicated to server arrangement. Encrypted consent is validated by comparing encrypted consent received from second agent module with two newly generated encrypted consents at server arrangement. Two new encrypted intents are generated at second agent module based on validation of encrypted consent. Encrypted intent stored at server arrangement is validated by comparing encrypted intent with two newly generated encrypted intents to authenticate transaction. Distributed ledger may be implemented by a block chain.

16 Claims, 5 Drawing Sheets

Related U.S. Application Data

(60) Provisional application No. 62/664,477, filed on Apr. 30, 2018.

(51) Int. Cl.
| | | |
|---|---|---|
| *G06F 21/62* | (2013.01) | |
| *H04L 9/06* | (2006.01) | |
| *G06F 21/60* | (2013.01) | |
| *H04L 9/32* | (2006.01) | |
| *G06Q 20/40* | (2012.01) | |

(52) U.S. Cl.
CPC ......... *G06Q 20/065* (2013.01); *G06Q 20/401* (2013.01); *H04L 9/0637* (2013.01); *H04L 9/3242* (2013.01)

(56) References Cited

U.S. PATENT DOCUMENTS

| | | | |
|---|---|---|---|
| 2011/0055274 A1* | 3/2011 | Scales | G06F 21/6218 |
| | | | 718/1 |
| 2017/0300978 A1* | 10/2017 | Narasimhan | G06Q 20/3829 |
| 2019/0158274 A1* | 5/2019 | Tormasov | H04L 9/3239 |
| 2019/0205558 A1* | 7/2019 | Gonzales, Jr. | G06F 16/1805 |
| 2019/0207749 A1* | 7/2019 | McKellar | H04L 9/3239 |

* cited by examiner

View Details

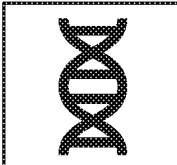

Long term effect of peripheral lipopolysaccharide in neonatal rats on inflammation and antioxidant parameters in brain Muller, Andy; Andreas, R. (Univ. Of Gothenburg, Sweden)

Jan 23rd, 2017

Type of Experiment: in-vivo brain

Stage Relevance: Pre-clinical

Materials Used: lipopolysaccharide

Summary:
This experiment was carried out in vivo to check if IL1b mRNA did not show any change in Cortex and Hippocampi. All LPS-induced changes were restored in 70 day old rats. 5 PUPs were treated with Saline and LPS (i.p. 2mg/kg). mRNA level of pro-inflammatory cytokine (1L 1b) was examined. Found that 1L 1b mRNA was left significantly unregulated in Substantia nigra. Further experiments like WB, ELISA were also conducted.

Concepts of the document:
LPS, mRNA level, cytokine, Substantia nigra

FIG. 2B

AUTHENTICATE TRANSACTIONS OF SECURED FILE IN BLOCKCHAIN

CROSS-REFERENCE TO RELATED APPLICATIONS

This application is a continuation application of prior U.S. non-provisional patent application Ser. No. 16/011,112, titled "AUTHENTICATE TRANSACTIONS OF SECURED FILE IN BLOCKCHAIN" and filed on Jun. 18, 2018, which is incorporated herein by reference. The said non-provisional application is based upon a provisional patent application No. U.S. 62/664,477 as filed on Apr. 30, 2018, which is herein incorporated by reference in its entirety. Moreover, the U.S. Non-Provisional application Ser. No. 16/010,479, filed Jun. 17, 2018; U.S. Non-Provisional application Ser. No. 16/011,045, filed Jun. 18, 2018; and U.S. Non-Provisional application Ser. No. 16/010,478, filed Jun. 17, 2018; provide a basis for both of these applications, namely the present continuation application and the said non-provisional application, the contents of which are all incorporated by reference herein.

TECHNICAL FIELD

The present disclosure relates generally to systems for authenticating secured file transactions; and more specifically, to systems for authenticating secured file transactions in a tri-party setup. Furthermore, the present disclosure relates to methods for authenticating secured file transactions in a tri-party setup.

BACKGROUND

In recent times, transaction processing has helped in disseminating information and knowledge across the world. In order to share such data over an online platform, data is divided into indivisible operations called transactions. Typically, server arrangements are employed as gate keepers to authenticate and secure transactions. However, storing the transactions in such server arrangements resulted in data breach.

Blockchain technology has helped in reducing the chances of a data breach by recording transactions between two parties in a verifiable and permanent way. However, Blockchains, in design, are made to be publicly visible. As a result, transitions that require secured and restricted access, cannot be developed over a blockchain platform.

Therefore, in light of the foregoing discussion, there exists a need to overcome the aforementioned drawbacks associated with the conventional digital platforms for authenticating secure transactions.

SUMMARY

The present disclosure seeks to provide an automated system for authenticating secured file transactions in a tri-party setup. The present disclosure also seeks to provide a method for authenticating secured file transactions in a tri-party setup.

In a first aspect, an embodiment of the present disclosure provides an automated system for authenticating secured file transactions in a tri-party setup, wherein the system comprises of a first agent module, a second agent module, a server arrangement, and a distributed ledger communicably coupled with each other, wherein the system is configured to store a hash corresponding to a transaction in the distributed ledger, wherein the transaction includes a file identifier, a first agent identifier, a second agent identifier, timestamp and a transaction key;

generate an unencrypted intent and encrypted intent of the first agent module, wherein the encrypted intent and the file identifier are shared with the server arrangement, wherein the unencrypted intent includes the first agent identifier, the second agent identifier, the file identifier, and a timestamp, wherein the encrypted intent is generated by encrypting the unencrypted intent with a first agent key;

generate an unencrypted consent and an encrypted consent of the server arrangement based on an association of the file identifier with the second agent identifier at the server arrangement, wherein the unencrypted consent includes the first agent identifier, the file identifier and a timestamp, wherein the encrypted consent is generated by encrypting the unencrypted consent with a server key, wherein the encrypted intent and the unencrypted consent are stored at the server arrangement;

communicate the encrypted consent to the first agent module along with a location of the second agent module;

communicate the encrypted consent, the unencrypted intent, the hash, the file identifier, and the first agent key to the second agent module based on the received location of the second agent module;

communicate the encrypted consent to the server arrangement;

validate the encrypted consent by comparing the encrypted consent received from the second agent module with at least two newly generated encrypted consents at the server arrangement, wherein the at least two newly encrypted consents are generated by encrypting the unencrypted consent with a server key, wherein the at least two newly encrypted consents include a current timestamp and a predefined prior timestamp;

generate at least two new encrypted intents, at the second agent module, based on the validation of the encrypted consent, wherein the at least two new encrypted intents are generated by encrypting the unencrypted intent with the first agent key, wherein the at least two new encrypted intents include current timestamp and a predefined prior timestamp;

validate the encrypted intent stored at the server arrangement by comparing the encrypted intent with the at least two newly generated encrypted intents to authenticate the transaction.

In a second aspect, an embodiment of the present disclosure provides a method for authenticating secured file transactions in a tri-party setup, the method being implemented via the system claimed in claim 1, the system comprising a first agent module, a second agent module, and a distributed ledger communicably coupled with each other, the method comprising:

storing a hash corresponding to a transaction in the distributed ledger, wherein the transaction includes a file identifier, a first agent identifier, a second agent identifier, timestamp and a transaction key;

generating an unencrypted intent and an encrypted intent of the first agent module, wherein the encrypted intent and the file identifier are shared with the server arrangement, wherein the unencrypted intent includes the first agent identifier, the second agent identifier, the file identifier, and a timestamp, wherein the encrypted intent is generated by encrypting the unencrypted intent with a first agent key;

generating an unencrypted consent and an encrypted consent of the server arrangement based on an association of the file identifier with the second agent identifier at the server arrangement, wherein the unencrypted consent includes the first agent identifier, the file identifier and a timestamp, wherein the encrypted consent is generated by encrypting the unencrypted consent with a server key, wherein the encrypted intent and the unencrypted consent are stored at the server arrangement;

communicating the encrypted consent to the first agent module along with a location of the second agent module;

communicating the encrypted consent, the unencrypted intent, the hash and the first agent key to the second agent module based on the received location of the second agent module;

communicating the encrypted consent to the server arrangement;

validating the encrypted consent by comparing the encrypted consent received from the second agent module with at least two newly generated encrypted consents at the server arrangement, wherein the at least two newly encrypted consents are generated by encrypting the unencrypted consent with a server key, wherein the at least two newly encrypted consents include a current timestamp and a predefined prior timestamp;

generating at least two new encrypted intents, at the second agent module, based on the validation of the encrypted consent, wherein the at least two new encrypted intents are generated by encrypting the unencrypted intent with the first agent key, wherein the at least two new encrypted intents include current timestamp and a predefined prior timestamp;

validating the encrypted intent stored at the server arrangement by comparing the encrypted intent with the at least two newly generated encrypted intents to authenticate the transaction.

In a third aspect, an embodiment of the present disclosure provides a computer program product for authenticating secured file transactions in a tri-party setup, wherein the system comprises of a first agent module, a second agent module, a server arrangement, and a distributed ledger communicably coupled with each other, wherein the system is configured to store a hash corresponding to a transaction in the distributed ledger, wherein the transaction includes a file identifier, a first agent identifier, a second agent identifier, timestamp and a transaction key;

generate an unencrypted intent and encrypted intent of the first agent module, wherein the encrypted intent and the file identifier are shared with the server arrangement, wherein the unencrypted intent includes the first agent identifier, the second agent identifier, the file identifier, and a timestamp, wherein the encrypted intent is generated by encrypting the unencrypted intent with a first agent key;

generate an unencrypted consent and an encrypted consent of the server arrangement based on an association of the file identifier with the second agent identifier at the server arrangement, wherein the unencrypted consent includes the first agent identifier, the file identifier and a timestamp, wherein the encrypted consent is generated by encrypting the unencrypted consent with a server key, wherein the encrypted intent and the unencrypted consent are stored at the server arrangement:

communicate the encrypted consent to the first agent module along with a location of the second agent module;

communicate the encrypted consent, the unencrypted intent, the hash and the first agent key to the second agent module based on the received location of the second agent module;

communicate the encrypted consent to the server arrangement;

validate the encrypted consent by comparing the encrypted consent received from the second agent module with at least two newly generated encrypted consents at the server arrangement, wherein the at least two newly encrypted consents are generated by encrypting the unencrypted consent with a server key, wherein the at least two newly encrypted consents include a current timestamp and a predefined prior timestamp;

generate at least two new encrypted intents, at the second agent module, based on the validation of the encrypted consent, wherein the at least two new encrypted intents are generated by encrypting the unencrypted intent with the first agent key, wherein the at least two new encrypted intents include current timestamp and a predefined prior timestamp;

validate the encrypted intent stored at the server arrangement by comparing the encrypted intent with the at least two newly generated encrypted intents to authenticate the transaction.

Embodiments of the present disclosure substantially eliminate or at least partially address the aforementioned problems in the prior art and enable authenticating secured file transactions.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIGS. 2A and 2B are example views of a graphical user interface that are presented to a first agent, in accordance with an embodiment of the present disclosure.

Figure 1:
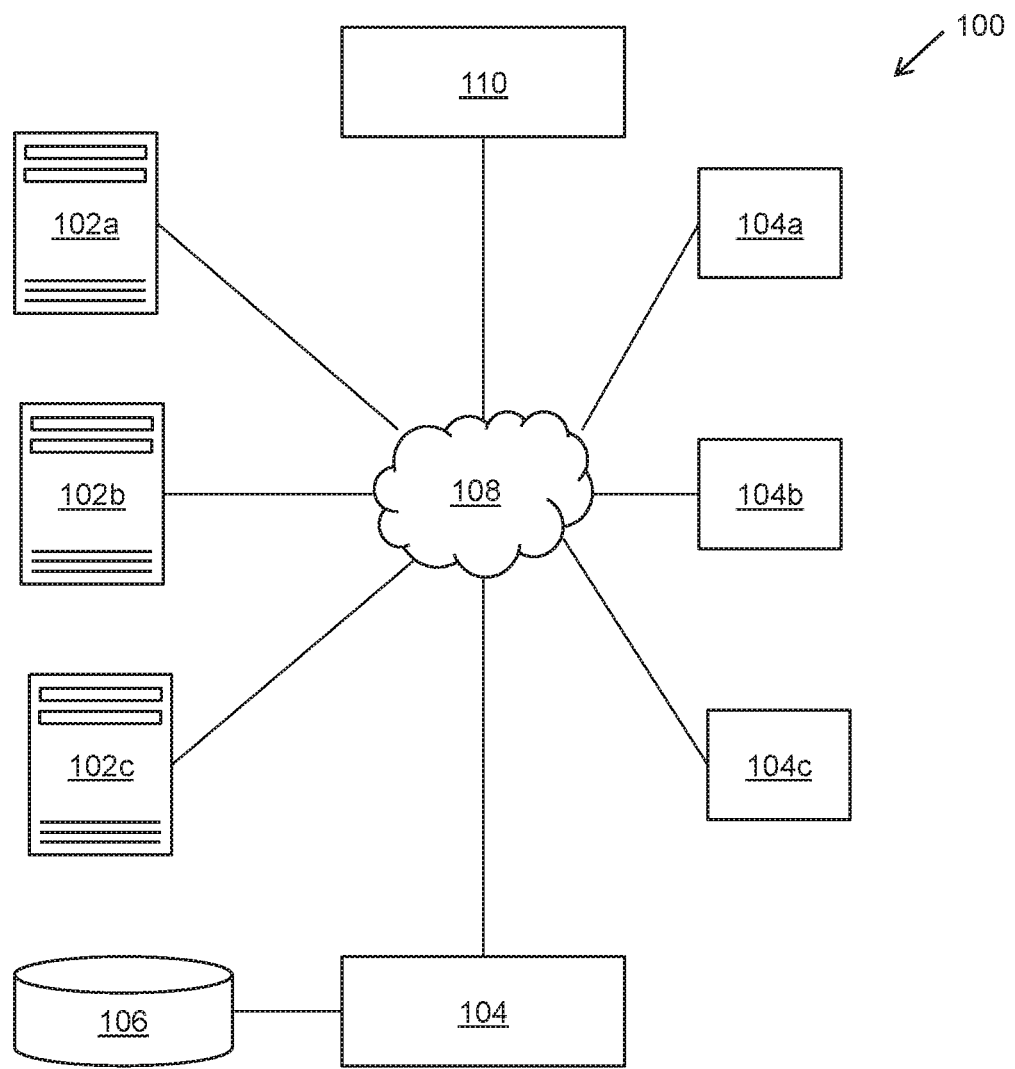
FIG. 1 is a schematic illustration of a network environment in which a system for authenticating secured file transactions in a tri-party setup is implemented pursuant to embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides an automated system for authenticating secured file transactions in a tri-party setup, wherein the system comprises of a first agent module, a second agent module, a server arrangement, and a distributed ledger communicably coupled with each other, wherein the system is configured to:

store a hash corresponding to a transaction in the distributed ledger, wherein the transaction includes a file identifier, a first agent identifier, a second agent identifier, timestamp and a transaction key;

generate an unencrypted intent and encrypted intent of the first agent module, wherein the encrypted intent and the file identifier are shared with the server arrangement, wherein the unencrypted intent includes the first agent identifier, the second agent identifier, the file identifier, and a timestamp, wherein the encrypted intent is generated by encrypting the unencrypted intent with a first agent key;

generate an unencrypted consent and an encrypted consent of the server arrangement based on an association of the file identifier with the second agent identifier at the server arrangement, wherein the unencrypted consent includes the first agent identifier, the file identifier and a timestamp, wherein the encrypted consent is generated by encrypting the unencrypted consent with a server key, wherein the encrypted intent and the unencrypted consent are stored at the server arrangement;

communicate the encrypted consent to the first agent module along with a location of the second agent module;

communicate the encrypted consent, the unencrypted intent, the hash and the first agent key to the second agent module based on the received location of the second agent module;

communicate the encrypted consent to the server arrangement;

validate the encrypted consent by comparing the encrypted consent received from the second agent module with at least two newly generated encrypted consents at the server arrangement, wherein the at least two newly encrypted consents are generated by encrypting the unencrypted consent with a server key, wherein the at least two newly encrypted consents include a current timestamp and a predefined prior timestamp;

generate at least two new encrypted intents, at the second agent module, based on the validation of the encrypted consent, wherein the at least two new encrypted intents are generated by encrypting the unencrypted intent with the first agent key, wherein the at least two new encrypted intents include current timestamp and a predefined prior timestamp;

validate the encrypted intent stored at the server arrangement by comparing the encrypted intent with the at least two newly generated encrypted intents to authenticate the transaction.

Embodiments of the present disclosure are of advantage in the aforesaid system of authenticating secure file transactions in a tri-party setup.

Pursuant to embodiments of the present disclosure, secured files include unpublished research documents, documents, document keys, software installers, license key. The files are further encrypted by public key to ensure that only authorized parties can access the file. The encrypted files are stored in a database or at an inter planetary file system. The system enables a user to receive the secured files using a tri-party setup upon payment of a token amount. The tri-party setup validates the payment and a request for accessing the secured files to ensure integrity of the transaction. The system includes a first client device associated with the first agent module, a second client device associated with the second agent module and the server arrangement to authenticate secured file transactions in the triparty setup.

Moreover, the system is configured to store a hash of the transaction on a blockchain platform. Specifically, the blockchain platform relates to a distributed ledger arrangement that is configured to store a list of transactions. More specifically, in the blockchain platform, each block stores a cryptographic hash of the transaction and a timestamp associated with the generation of the transaction. In an example, the hash of transaction is a string of characters like "UGYYDJBKJFRDHLKJLHKHGHGFHGJHGKJKJ".

The string of characters denotes the block location in blockchain. The block includes an identifier, a first agent identifier, a second agent identifier, timestamp and a transaction key for storing and validating the transaction.

Further, the blockchain platform is managed by a peer-to-peer network collectively adhering to a protocol for inter-node communication and validating new blocks in a blockchain. Moreover, once a block is stored in the blockchain (namely, the distributed ledger arrangement), the block cannot be altered. Thus, storing the hash of the transaction in the blockchain platform provides an immutable proof of validity of the transaction with its associated timestamp.

Furthermore, the system is configured to communicate the hash of the transaction to the first agent module, for example, upon paying the token amount, for accessing the secured file. The system is configured to communicate, to the first agent module, a private key to decrypt the secured file, upon successful validation of the transaction, for accessing the secured file.

Throughout the present disclosure, the term "server" generally refers to a device executing an application, program, or process in a client/server relationship that responds to requests for information or services by another application, program, process or device (namely, a client) on a data communication network. Optionally, a given server is implemented by way of a device executing a computer program that provides various services (for example, such as a database service) to other devices, modules or apparatus.

The term "client device" generally refers to a device executing an application, program, or process in a client/server relationship that requests information or services from another application, program, process or device (namely, a server) on a data communication network. Importantly, the terms "client" and "server" are relative, as an application may be a client to one application but a server to another application.

Notably, the first and second client devices are configured to function as a "client" in a client/server relationship with the server arrangement. However, the first and second client devices may be configured to function as a "server" in a client/server relationship with other computing devices. Throughout the present disclosure, the terms "first client device" and "second client device" refer to devices associated with a first user and a second user that acts as clients to the server arrangement in a client/server relationship, wherein such devices can be personal devices or servers in local environments of the first user and the second user, respectively. As an example, a first user associated with the first client device is interested in accessing the file, while the second client device can be an internal server of a research organization which holds the key for accessing the file.

It will be appreciated that a user associated with the first client device can be any of the one or more researchers or a representative of the one or more researchers or buyers interested in accessing a file. Alternatively, the one or more researchers are involved in development of drug. Beneficially, the user is presented with a graphical user interface, via the first client device. Optionally, the graphical user interface is provided in a form of a web page that allows the user to select a secured file for gaining further access to contents of the file, wherein the graphical user interface is hosted by the server arrangement. The server arrangement is operable to present a summarized view on the graphical user interface of the secured file for selection by the user. Beneficially, the secured file or the private key associated with descripting the secured file is never transferred via the server arrangement, before, during or after the transaction. The server arrangement is involved only in hosting the information about the secured files (including pictures, pricing, etc.) thereby facilitating match-making. Further beneficially, the secured files are transferred directly from a second client device to a first client device once the transaction is validated.

Alternatively, optionally, the graphical user interface is provided by way of a trusted software application that, when executed at the first client device, allows the user to select and pay for the secured file. Optionally, in such a case, the trusted software application is received (for example, downloaded) from the server arrangement or a trusted third party. The trusted third party can be a publically-accessible digital distribution platform, for example, such as Google Play®, the App Store® (for iOS®) and the like.

Pursuant to embodiments of the present disclosure, a first user associated with the first client device makes a payment for accessing a secured file. The first agent module associated with the first client device adds the transaction to a distributed ledger and communicates the hash associated with the transaction, and payment details to the server arrangement. Optionally the system is operable to receive a confirmation for payment, with respect to the transaction, from the distributed ledger.

The system is operable to generate an unencrypted intent and encrypted intent of the first agent module. The unencrypted intent is encrypted using a first agent key to generate the encrypted intent. The unencrypted intent includes the first agent identifier, the second agent identifier, the file identifier, and a timestamp associated with the transaction. The encrypted intent and the file identifier are shared with the server arrangement to raise a request for accessing the secured file and establishing a triparty setup. Beneficially, the encrypted intent is used to verify and ensure that the first agent module is associated with the first user of the first client device. Further beneficially, the encrypted intent is also used to verify the transaction conducted by the first agent module for requesting access to the secured file. Validation of the encrypted intent allows the system to invalidate a fake user having access to the server arrangement. Moreover, the unencrypted intent is further shared with the second agent module along with the first agent key used for encrypting the unencrypted intent at the first agent module and, also ensures that the first agent key is never shared with the server arrangement. Beneficially, the validation of the encrypted intent allows the system to prevent an attempt of a fake user to use the first user identifier stored at the server arrangement. Optionally, the first agent key is dynamically generated at the first user module. The dynamic generation of the first agent key allows the system to ensure that the key cannot be saved for validating another transaction. Optionally, the first agent key is used for encrypting the file identifier, the first agent identifier and the second agent identifier to generate the transaction key. Optionally, unencrypted intent is stored at the first agent module. the Beneficially, the request for accessing the secured file is timebound, for example, the request expires in 1 minute.

The server arrangement receives payment details, the encrypted intent and the file identifier associated with the transaction for accessing the secured files. The server arrangement is configured to associate the transaction by identifying a second agent module associated with the file identifier. Optionally, the server arrangement validates the payment details with the distributed ledger. Further optionally, the server arrangement includes a data repository for storing a list of associated file identifiers, second agent module and location of the second agent module.

Based on the association of the file identifier with the second agent module, the system is operable to generate an unencrypted consent and an encrypted consent of the server arrangement. Beneficially, the association of the file identifier allows the system to confirm a triparty setup based on the received encrypted intent. The unencrypted consent includes the first agent identifier, the file identifier and a timestamp. The encrypted consent is generated by encrypting the unencrypted consent with a server key. The server key used for encrypting the unencrypted consent is stored at the server arrangement along with the unencrypted consent and encrypted intent of the transaction in the data repository of the server arrangement. Beneficially, a fake user cannot pretend as the server arrangement unless they have the server key. In an embodiment, the encrypted consent is a signed form for verification at the second agent module.

The system is operable to communicate the encrypted consent and the location of the second agent module to the first agent module. Beneficially, the encrypted consent of the server arrangement is timebound to avoid misuse of the consent at any later event. In an example, the encrypted consent expires in 1 min to avoid the use of the encrypted consent in another transaction or a forged transaction.

The first agent module is operable to communicate the encrypted consent received from the server arrangement, the unencrypted intent, the hash, the file identifier, and the first agent key to the second agent module based on the received location of the second agent module. The first agent module is operable to communicate the said data using https, tcp, ftp and other similar.

The second agent module is operable to validate the encrypted consent with the server arrangement by communicating the encrypted consent of the server arrangement.

The server arrangement is operable to generate at least two new encrypted consents associated with current timestamp and a predefined prior timestamp. In an example, the predefined prior timestamp is current timestamp −1 min. The server arrangement is operable to validate the encrypted consent received from the second agent module with the generated at least two new encrypted consents. The server arrangement is operable to validate the encrypted consent by comparing it with the generated at least two new encrypted consents. Beneficially, validation at the server arrangement of the encrypted consent allows establishment of the triparty setup to ensure that the key exchange happens only with consent of the server arrangement and without any network delays of more than 1 min. If the comparison yields a match, then the request is verified as true, it goes into the next step else request aborts and appropriate message is passed on to the first agent module. The aborts request is also generated if the encrypted consent is received after the predefined time-period.

The second agent is operable to generate at least two new encrypted intents based on the validation of the encrypted consent at the server arrangement. The second agent is operable to generate the at least two new encrypted intents by encrypting the unencrypted intent with the first agent key received from the first agent module. The at least two new encrypted intents include current timestamp and a predefined prior timestamp. In an example, the predefined prior timestamp is current timestamp −1 min. The second agent module is operable the communicate the at least two new encrypted intents to the server arrangement for validation via https, ftp, tcp, etc.

The server arrangement is operable to validate the encrypted intent stored at the server arrangement by comparing the encrypted intent with the at least two newly generated encrypted intents received from the second agent module. If the comparison yields a match, then the request is verified as true, it goes into the next step else request aborts and appropriate message is passed on to the first agent module. The aborts request is also generated if the encrypted consent is received after the predefined time-period.

Optionally, the second agent module is operable to receive a confirmation of the validation of the encrypted intent. The confirmation of the intent allows the system to authenticate the server arrangement. Beneficially, the generation of the at least two new encrypted intents at the second agent module allows authentication of the server arrangement by ensuring that the first agent key is never shared with the server arrangement. Further beneficially, the triparty setup is validated after receiving the confirmation of the intent. The second agent module is further operable to receive the hash of the transaction from the distributed ledger. The second agent module is configured to compare the hash received from the server arrangement and the hash received from the distributed ledger to validate the transaction.

Optionally, the second agent module is further operable to validate the transaction key stored in the block. The second agent module is operable to generate a new transaction key, wherein the new transaction key is generated by encrypting the first agent identifier, the second agent identifier and the file identifier with the first agent key stored at the second agent module. Based on the authentication of the transaction key the second agent module is operable to share the key for decrypting the secured files and accessing the content of the secured file.

In a second aspect, an embodiment of the present disclosure provides a method for authenticating secured file transactions in a tri-party setup, the method being implemented via a computer system, the computer system comprising a first agent module, a second agent module, and a distributed ledger communicably coupled with each other, the method comprising:

storing a hash corresponding to a transaction in the distributed ledger, wherein the transaction includes a file identifier, a first agent identifier, a second agent identifier, timestamp and a transaction key;

generating an unencrypted intent and an encrypted intent of the first agent module, wherein the encrypted intent and the file identifier are shared with the server arrangement, wherein the unencrypted intent includes the first agent identifier, the second agent identifier, the file identifier, and a timestamp, wherein the encrypted intent is generated by encrypting the unencrypted intent with a first agent key;

generating an unencrypted consent and an encrypted consent of the server arrangement based on an association of the file identifier with the second agent identifier at the server arrangement, wherein the unencrypted consent includes the first agent identifier, the file identifier and a timestamp, wherein the encrypted consent is generated by encrypting the unencrypted consent with a server key, wherein the encrypted intent and the unencrypted consent are stored at the server arrangement;

communicating the encrypted consent to the first agent module along with a location of the second agent module;

communicating the encrypted consent, the unencrypted intent, the hash and the first agent key to the second agent module based on the received location of the second agent module;

communicating the encrypted consent to the server arrangement;

validating the encrypted consent by comparing the encrypted consent received from the second agent module with at least two newly generated encrypted consents at the server arrangement, wherein the at least two newly encrypted consents are generated by encrypting the unencrypted consent with a server key, wherein the at least two newly encrypted consents include a current timestamp and a predefined prior timestamp;

generating at least two new encrypted intents, at the second agent module, based on the validation of the encrypted consent, wherein the at least two new encrypted intents are generated by encrypting the unencrypted intent with the first agent key, wherein the at least two new encrypted intents include current timestamp and a predefined prior timestamp;

validating the encrypted intent stored at the server arrangement by comparing the encrypted intent with the at least two newly generated encrypted intents to authenticate the transaction.

The present disclosure also relates to the method as described above. Various embodiments and variants disclosed above, with respect to the aforementioned first aspect, apply mutatis mutandis to the method.

Optionally, the method comprises generating the transaction key by encrypting the first agent identifier, the second agent identifier and the file identifier with the first agent key.

Optionally, the method comprises dynamically generating the first agent key at the first user module Optionally, the method comprises validating the hash corresponding to the transaction by comparing the hash received from the server arraignment and hash received from the distributed ledger.

Optionally, the method comprises validating the transaction key to authenticate the transaction, wherein the transaction key is validated by comparing the transaction key stored at the distributed ledger with a new transaction key, wherein the new transaction key is generated by encrypting the first agent identifier, the second agent identifier and the file identifier with the first agent key stored at the second agent module.

Moreover, optionally, the method comprises payment details associated with the transaction for validation at the server arrangement.

Optionally, the method comprises associating the received file identifier with a list of second module identifier to identify the second agent identifier and the location of the second agent module, wherein the list of second module identifier and file identifier are stored in a data repository of the server arrangement.

Optionally, in this regard, the method further comprises storing the unencrypted consent, the encrypted intent, and the server key used for encrypting the unencrypted consent at the data repository of the server arrangement.

Optionally, in this regard, the method comprises storing at the data repository of the server arrangement.

In a third aspect, an embodiment of the present disclosure provides a computer program product for authenticating secured file transactions in a tri-party setup, wherein the system comprises of a first agent module, a second agent module, a server arrangement, and a distributed ledger communicably coupled with each other, wherein the system is configured to
- store a hash corresponding to a transaction in the distributed ledger, wherein the transaction includes a file identifier, a first agent identifier, a second agent identifier, timestamp and a transaction key;
- generate an unencrypted intent and encrypted intent of the first agent module, wherein the encrypted intent and the file identifier are shared with the server arrangement, wherein the unencrypted intent includes the first agent identifier, the second agent identifier, the file identifier, and a timestamp, wherein the encrypted intent is generated by encrypting the unencrypted intent with a first agent key;
- generate an unencrypted consent and an encrypted consent of the server arrangement based on an association of the file identifier with the second agent identifier at the server arrangement, wherein the unencrypted consent includes the first agent identifier, the file identifier and a timestamp, wherein the encrypted consent is generated by encrypting the unencrypted consent with a server key, wherein the encrypted intent and the unencrypted consent are stored at the server arrangement:
- communicate the encrypted consent to the first agent module along with a location of the second agent module;
- communicate the encrypted consent, the unencrypted intent, the hash and the first agent key to the second agent module based on the received location of the second agent module;
- communicate the encrypted consent to the server arrangement;
- validate the encrypted consent by comparing the encrypted consent received from the second agent module with at least two newly generated encrypted consents at the server arrangement, wherein the at least two newly encrypted consents are generated by encrypting the unencrypted consent with a server key, wherein the at least two newly encrypted consents include a current timestamp and a predefined prior timestamp;
- generate at least two new encrypted intents, at the second agent module, based on the validation of the encrypted consent, wherein the at least two new encrypted intents are generated by encrypting the unencrypted intent with the first agent key, wherein the at least two new encrypted intents include current timestamp and a predefined prior timestamp;
- validate the encrypted intent stored at the server arrangement by comparing the encrypted intent with the at least two newly generated encrypted intents to authenticate the transaction.

DETAILED DESCRIPTION OF THE DRAWINGS

Referring now to the drawings, particularly by their reference numbers, FIG. 1 is a schematic illustration of a network environment 100, wherein a system configured to authenticate secure transactions in a triparty setup is implemented pursuant to embodiments of the present disclosure.

The network environment 100 includes a plurality of first client devices (depicted as client devices 102a, 102b and 102c) and second client devices (depicted as client devices 104a, 104b and 104c) associated with a plurality of users, a server arrangement 104 of the system, a database arrangement 106 associated with the server arrangement 104, a distributed ledger 110, and a data communication network 108. The server arrangement 104 comprises a processor communicably coupled via the data communication network 108 with first client devices 102a, 102b and 102c and second client devices 104a, 104b, 104c. Optionally, the network environment 100 also includes the distributed ledger 110 communicably coupled via the data communication network 108 with the processor 110 of the server arrangement 104 and first client devices 102a, 102b and 102c and second client devices 104a, 104b, 104c.

FIG. 1 is merely an example, which should not unduly limit the scope of the claims herein. It is to be understood that the specific designation for the network environment 100 is provided as an example and is not to be construed as limiting the network environment 100 to specific numbers, types, or arrangements of server arrangements, client devices, database arrangements, data communication networks and database servers. A person skilled in the art will recognize many variations, alternatives, and modifications of embodiments of the present disclosure.

Figure 2A:

FIGS. 2A and 2B are example views of a graphical user interface that are presented to a user, in accordance with an embodiment of the present disclosure. The graphical user interface allows the user to view the provide the information pertaining to the document.

With reference to FIG. 2A, a first example view includes text boxes and/or drop-down menus that allow the user to enter details and/or select a suitable option.

With reference to FIG. 2B, a second example view allows the user to select one or more documents for submission.

Figure 3A:
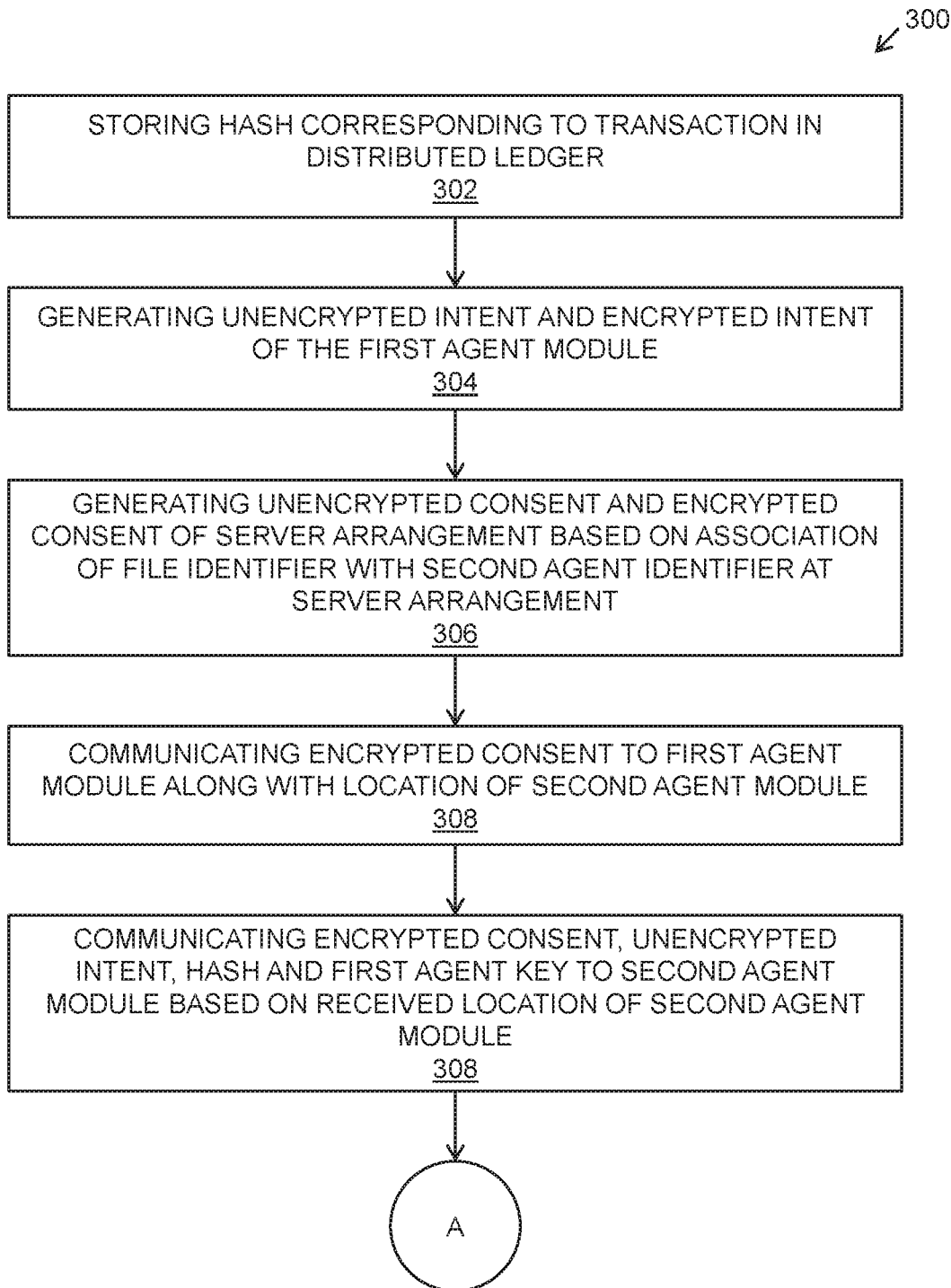
FIGS. 3A and 3B collectively illustrate steps of a method for authenticating secured file transactions in a tri-party setup, in accordance with an embodiment of the present disclosure.
Figure 3B:
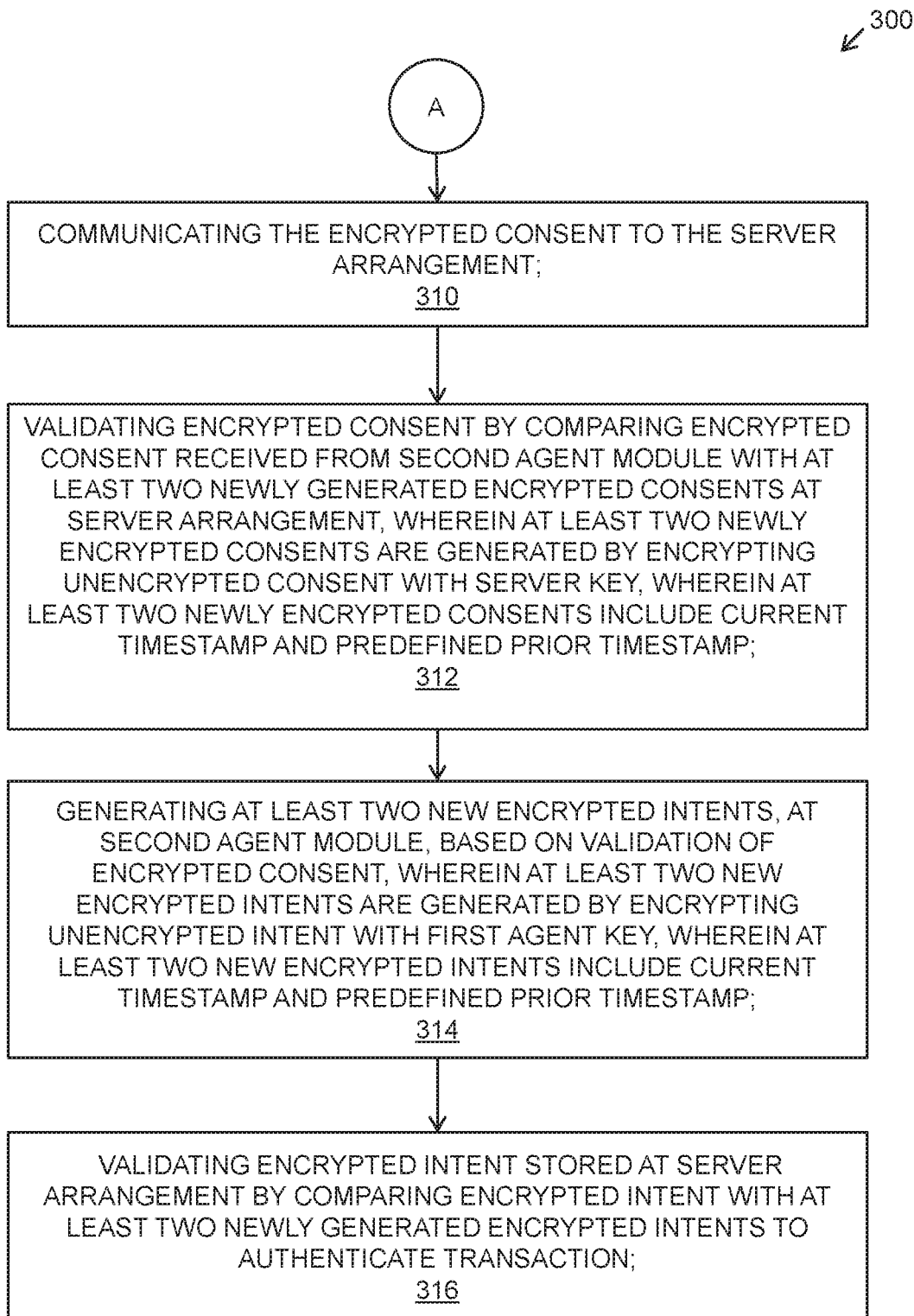

Referring to FIGS. 3A and 3B collectively, illustrated are steps of a method of authenticating secured file transactions in a tri-party setup, in accordance with an embodiment of the present disclosure. The method is depicted as a collection of steps in a logical flow diagram, which represents a sequence of steps that can be implemented in hardware, software, or a combination thereof, for example as aforementioned.

At a step 302, storing a hash corresponding to a transaction in the distributed ledger, wherein the transaction includes a file identifier, a first agent identifier, a second agent identifier, timestamp and a transaction key.

At a step 304, generate an unencrypted intent and an encrypted intent of the first agent module, wherein the encrypted intent and the file identifier are shared with the server arrangement, wherein the unencrypted intent includes the first agent identifier, the second agent identifier, the file identifier, and a timestamp, wherein the encrypted intent is generated by encrypting the unencrypted intent with a first agent key.

At a step 306, generate an unencrypted consent and an encrypted consent of the server arrangement based on an association of the file identifier with the second agent identifier at the server arrangement, wherein the unencrypted consent includes the first agent identifier, the file identifier and a timestamp, wherein the encrypted consent is generated by encrypting the unencrypted consent with a server key, wherein the encrypted intent and the unencrypted consent are stored at the server arrangement.

At a step 308, communicate the encrypted consent to the first agent module along with a location of the second agent module.

At a step 310, communicate the encrypted consent, the unencrypted intent, the hash and the first agent key to the second agent module based on the received location of the second agent module.

At a step 312, communicating the encrypted consent to the server arrangement.

At a step 314, validate the encrypted consent by comparing the encrypted consent received from the second agent module with at least two newly generated encrypted consents at the server arrangement, wherein the at least two newly encrypted consents are generated by encrypting the unencrypted consent with a server key, wherein the at least two newly encrypted consents include a current timestamp and a predefined prior timestamp.

At a step 316, generate at least two new encrypted intents, at the second agent module, based on the validation of the encrypted consent, wherein the at least two new encrypted intents are generated by encrypting the unencrypted intent with the first agent key, wherein the at least two new encrypted intents include current timestamp and a predefined prior timestamp.

At a step 318, validate the encrypted intent stored at the server arrangement by comparing the encrypted intent with the at least two newly generated encrypted intents to authenticate the transaction.

The steps 302 to 318 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. An automated system for authenticating file transactions in a tri-party setup, wherein the system is configured to:

store a hash corresponding to a transaction in a distributed ledger;

generate an unencrypted intent and encrypted intent of a first client device, and to communicate the encrypted intent and a file identifier to a server arrangement so as to raise a request for accessing a secured file, wherein the request for accessing the secured file is time bound, and wherein the encrypted intent is generated by encrypting the unencrypted intent with a first client key, further wherein the first client key is dynamically generated at the first client device;

wherein the tri-party set up comprises the first client device, a second client device, and the server arrangement all communicating together to authenticate and perform the file transactions, generate an unencrypted consent and an encrypted consent of the server arrangement, wherein the encrypted consent is generated by encrypting the unencrypted consent with a server key, wherein the encrypted intent and the unencrypted consent are stored at the server arrangement, wherein the encrypted consent of the sever arrangement is time bound;

communicate the encrypted consent to the first client device along with a location of the second client device;

communicate the encrypted consent, the unencrypted intent and the first client key from the first client device to the second client device based on the received location of the second client device;

communicate the encrypted consent from the second client device to the server arrangement;

validate the encrypted consent at the server arrangement by comparing the encrypted consent received from the second client device with at least two newly generated encrypted consents at the server arrangement, wherein the at least two newly encrypted consents are generated by encrypting the unencrypted consent with the server key, wherein the at least two newly encrypted consents include a current timestamp and a predefined prior timestamp;

generate at least two new encrypted intents, based on the validation of the encrypted consent, at the second client device, wherein the at least two new encrypted intents are generated by encrypting the unencrypted intent with the first client key, wherein the at least two new encrypted intents include current timestamp and a predefined prior timestamp; and validate the encrypted intent stored at the server arrangement by comparing the encrypted intent with the at least two newly generated encrypted intents received from the second client device, wherein the second client device receives a confirmation of the validation of the encrypted intent to authenticate the server arrangement.

2. The system of claim 1, wherein a transaction key is generated by encrypting a first client identifier, a second client identifier and a file identifier with the first client key.

3. The system of claim 1, wherein the system is further configured to validate the hash corresponding to the transaction by comparing the hash received from the server arrangement and hash received from the distributed ledger.

4. The system of claim 2, wherein the system is further configured to validate the transaction key stored in the distributed ledger, wherein the transaction key is validated by comparing the transaction key stored at the distributed ledger with a new transaction key, wherein the new transaction key is generated by encrypting the first client identifier, the second client identifier and the file identifier with the first client key stored at the second client device.

5. The system of claim 1, wherein the system is further configured to share payment details associated with the transaction for validation at the server arrangement.

6. The system of claim 1, wherein the server arrangement is configured to associate the received file identifier with a list of second client identifier, to identify the second client identifier and the location of the second client device, wherein the list of second client identifier and file identifier are stored in a data repository associated with the server arrangement.

7. The system of claim 6, wherein the unencrypted consent, the encrypted intent, and the server key used for encrypting the unencrypted consent is stored at the data repository associated with the server arrangement.

8. The system of claim 1, wherein the unencrypted intent is stored at the first client device.

9. A method for authenticating file transactions in a tri-party setup, the method comprising:
   storing a hash corresponding to a transaction in a distributed ledger;
   wherein the tri-party set up comprises a first client device, a second client device, and a server arrangement all communicating together to authenticate and perform the file transactions, the method further comprising:
   generating an unencrypted intent and an encrypted intent of the first client device, wherein the encrypted intent and the file identifier are shared with the server arrangement so as to raise a request for accessing a secured file, wherein the request for accessing the secured file is time bound wherein the encrypted intent is generated by encrypting the unencrypted intent with a first client key, wherein the first client key is dynamically generated at the first client device;
   generating an unencrypted consent and an encrypted consent of the server arrangement, wherein the encrypted consent is generated by encrypting the unencrypted consent with a server key, wherein the encrypted intent and the unencrypted consent are stored at the server arrangement, wherein the encrypted consent of the sever arrangement is time bound;
   communicating the encrypted consent to the first client device along with a location of the second client device;
   communicating the encrypted consent, the unencrypted intent, and the first client key from the first client device to the second client device based on the received location of the second client device;
   communicating the encrypted consent from the second client device to the server arrangement;
   validating the encrypted consent by comparing the encrypted consent received from the second client device with at least two newly generated encrypted consents at the server arrangement, wherein the at least two newly encrypted consents are generated by encrypting the unencrypted consent with the server key, wherein the at least two newly encrypted consents include a current timestamp and a predefined prior timestamp;
   generating at least two new encrypted intents, at the second client device, based on the validation of the encrypted consent, wherein the at least two new encrypted intents are generated by encrypting the unencrypted intent with the first client key, wherein the at least two new encrypted intents include current timestamp and a predefined prior timestamp;
   validating the encrypted intent stored at the server arrangement by comparing the encrypted intent with the at least two newly generated encrypted intents received from the second client device,
   wherein the second client device receives a confirmation of the validation of the encrypted intent to authenticate the server arrangement.

10. The method of claim 9, further comprising generating a transaction key by encrypting a first client identifier, a second client identifier and a file identifier with the first client key.

11. The method of claim 9, further comprising validating the hash corresponding to the transaction by comparing the hash received from the server arrangement and hash received from the distributed ledger.

12. The method of claim 10, further comprising validating the transaction key to authenticate the transaction, wherein the transaction key is validated by comparing the transaction key stored at the distributed ledger with a new transaction key, wherein the new transaction key is generated by encrypting the first client identifier, the second client identifier and the file identifier with the first client key stored at the second client device.

13. The method of claim 9, further comprising sharing payment details associated with the transaction for validation at the server arrangement.

14. The method of claim 9, further comprising associating the received file identifier with a list of second client identifier to identify the second client identifier and the location of the second client device, wherein the list of second client identifier and file identifier are stored in a data repository associated with the server arrangement.

15. The method of claim 9, further comprising storing the unencrypted consent, the encrypted intent, and the server key used for encrypting the unencrypted consent at the data repository of the server arrangement.

16. The method of claim 9, further comprising the unencrypted intent stored at the first client device.

* * * * *